United States Patent [19]

Boiteau

[11] Patent Number: 5,002,111

[45] Date of Patent: Mar. 26, 1991

[54] FABRIC LOCKING DEVICE FOR ROLL-UP AWNING

[75] Inventor: Charles Boiteau, Chelmsford, Mass.

[73] Assignee: Coleman Faulkner, Inc., Malden, Mass.

[21] Appl. No.: 482,145

[22] Filed: Feb. 20, 1990

[51] Int. Cl.⁵ .............................................. E04F 10/06
[52] U.S. Cl. ..................... 160/67; 160/387; 160/395; 160/403
[58] Field of Search ............... 160/66, 67, 387, 392, 160/395, 396, 399, 403; 24/460, 462

[56] References Cited

U.S. PATENT DOCUMENTS

| | | | |
|---|---|---|---|
| 278,884 | 6/1883 | Clawson | 160/395 |
| 572,249 | 12/1896 | Eckert | 160/395 X |
| 848,175 | 3/1907 | Johnston | 160/396 |
| 956,240 | 4/1910 | Watson | 160/395 |
| 1,092,457 | 4/1914 | Schoenberg | 160/395 X |
| 1,399,812 | 12/1921 | Sorensen | 160/396 X |
| 1,492,736 | 5/1924 | Metzger | 160/387 |
| 1,567,674 | 12/1925 | Pease et al. | 160/403 |
| 3,329,195 | 7/1967 | Kochanowski | 160/395 X |
| 4,258,778 | 3/1981 | Upton et al. | 160/67 X |

Primary Examiner—David M. Purol

[57] ABSTRACT

A locking device is provided for anchoring the side edges of a roll-up awning to prevent wrinkles in the awning. The awning includes a hem which is positioned in a groove of a roll-up bar. The locking device comprises a body portion which is sized to be slidably received in the groove for longitudinal sliding movement therein and a radially enlarged portion for clamping the awning against the wall of the groove. A screw on the body portion is screwed into engagement with the wall of the groove to anchor the locking device against longitudinal movement.

6 Claims, 2 Drawing Sheets

FABRIC LOCKING DEVICE FOR ROLL-UP AWNING

BACKGROUND

This invention relates to roll-up awnings, and, more particularly, to a locking device for preventing wrinkles in a roll-up awning.

Owners of recreational vehicles such as travel trailers and motor homes often desire to set up an awning when the vehicle is parked for providing shade, protection from rain, etc. Awning assemblies are available which are mounted on the side of the vehicle. Such awning assemblies conventionally include a spring-biased roller or roll-up bar on which the awning is wound, a pair of lower support arms which are pivotally mounted on the vehicle, and a pair of upper support arms which are also attached to the vehicle. The upper and lower support arms support the roller when the awning is extended. The lower support arms rotatably support the roller, and the awning is extended by pulling the roller away from the vehicle and pivoting the lower support arms so that the awning unwinds from the roller.

The awning is secured to the roller by means of a groove in the roller. The end of the awning includes a hem which is wrapped around a rope or cord, and the hem is inserted longitudinally into the groove. The rope prevents the hem from being withdrawn from the groove.

Although the awning is secured against withdrawal from the groove, the side edges of the awning can move toward each other and cause gathering or wrinkling of the awning. Also, when the roller is rotated to roll up the awning, the hem of the awning might slide within the groove, thereby interfering with proper roll-up.

Some users of awnings have resorted to drilling through the roller and fabric of the awning and securing the hem with sheet metal screws. However, this creates a weak spot in the fabric that is subject to tearing.

SUMMARY OF THE INVENTION

The invention provides a locking device or clamp which anchors the side edges of the awning. The locking device includes a body portion which is sized to be slidably received in the groove of the roller and a radially enlarged portion which can be inserted into the hem of the awning for clamping the fabric of the awning against the wall of the groove. A set screw is threadedly engaged with the locking device and is engageable with the wall of the groove for securing the locking device against longitudinal movement. A locking device is inserted into the hem of the awning on each side of the awning to clamp the fabric against the wall of the groove. The set screws are then rotated to anchor the locking devices within the groove. The locking devices hold the awning taut to prevent vertical wrinkles and prevent the hem from sliding in the groove. The locking devices also make it possible to change the awning without removing the rear spring assembly from the roller.

DESCRIPTION OF THE DRAWING

The invention will be explained in conjunction with an illustrative embodiment shown in the accompanying drawing, in which.

DESCRIPTION OF SPECIFIC EMBODIMENT

Figure 1:
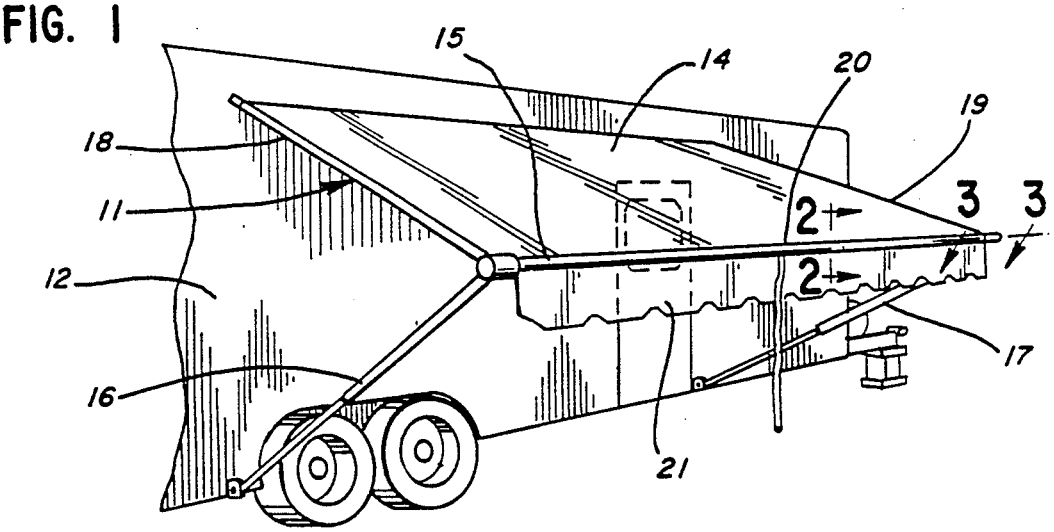
FIG. 1 is a fragmentary perspective view of a travel trailer equipped with an awning assembly constructed in accordance with the invention.

Referring to FIG. 1, the numeral 11 designates generally an awning assembly which is mounted on a side wall 12 of a travel trailer 13. The invention enjoys particular utility with respect to recreational vehicles such as travel trailers, but it will be understood that the awning assembly can be used with other support structures.

The awning assembly includes a fabric awning 14, a roller or roll-up bar 15 on which the awning can be wound, a pair of lower telescoping arms 16 and 17, and a pair of upper pivoting rafter arms 18 and 19. The upper end of the awning is secured within a conventional rail which extends horizontally along the travel trailer. The bottom end 20 of the awning is secured to the roller 15, and a valance 21 may also be secured to the roller and hangs downwardly when the awning is unwound as shown in FIG. 1.

The roller 15 and support arms 16-19 are conventional and well known in the art. The details of one specific awning assembly are described in U.S. Pat. No. 4,719,954.

Figure 2:
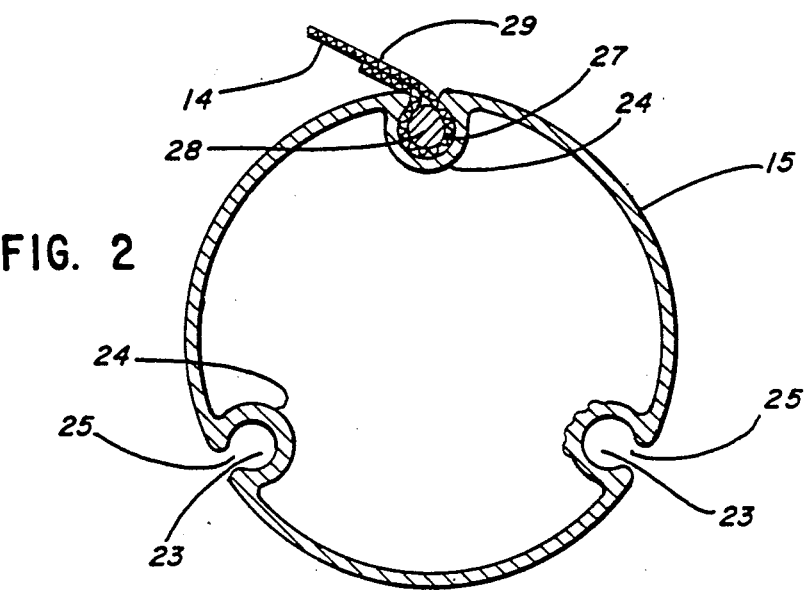
FIG. 2 is an enlarged transverse sectional view of the roll-up bar of the awning assembly taken along the line 2—2 of FIG. 1.

The roller 15 is an extruded hollow tube (FIG. 2) which is provided with one or more longitudinally extending grooves 23. Each groove is provided by an arcuate wall 24 and a longitudinal slot 25 in the cylindrical wall of the roller. The width of the slot 25 is less than the inside diameter of the wall 24 of the groove.

The awning 14 may be made from any conventional material such as vinyl-coated polyester fabric. The bottom end 20 of the awning is reversly folded to form a looped hem 27 (FIG. 2) which encircles a rope or cord 28. The folded fabric is secured by stitching 29 or thermal bonding. The rope 28 forms an elongated bead which is wider than the slot 25, and the rope prevents the bottom edge of the awning from being withdrawn from the groove 23. The awning is inserted into the groove by sliding the beaded hem longitudinally into the groove from one end of the roller 15.

The retention of the awning within the groove by a beaded hem is conventional. However, since the beaded hem can slide longitudinally within the groove, the two side edges 30 (FIG. 3) of the awning can move together to cause vertical wrinkling of the awning unless the awning is secured against longitudinal movement within the groove. Each side edge of the awning is secured by a locking pin 31 which is inserted into the end of the groove.

Referring to FIGS. 5–9, the locking pin 31 includes a generally cylindrical main body 32, a tapered forward portion 33, and a radially enlarged generally annular collar 34 on the rear end. The body includes an arcuate surface 35 (FIG. 9) and a flat bottom surface 36, and the collar 34 includes an arcuate surface 37 and a flat bottom 36. A tab 39 projects radially upwardly from the top of the body and the collar.

The body is provided with a threaded bore 40 (FIG. 9), and a set screw 41 (FIG. 5) is threaded into the bore. The upper end of the screw is provided with a hex socket 42 for a hex key.

The tapered forward portion 33 has an eliptical vertical cross section (FIG. 8) and tapers to a bullet-shaped front end 44. The forward portion includes an arcuate top surface 45 which curves about a center 46 and an arcuate bottom surface 47 which curves about a center 48. The numeral 49 in FIG. 8 designates the axial centerline of the cylindrical body 32 (see also FIG. 9).

The tapered forward portion 33 merges with an intermediate portion 50. The intermediate portion includes an arcuate bottom surface 51 (FIG. 7) which curves about a center 52 and a pair of upwardly converging generally flat top surfaces 53 and 54. The center 52 is aligned with the center 48 of the forward position.

The radius of the annular collar 34 is slightly less than the internal radius of the arcuate wall 24 which forms the groove 23, and the maximum height or vertical diameter of the tapered forward portion 33 is less than the diameter of the groove. Accordingly, the locking pin 31 can slide longitudinally within the groove. The tab 39 projects outwardly through the slot 25 and prevents the locking pin from rotating within the groove.

Figure 3:
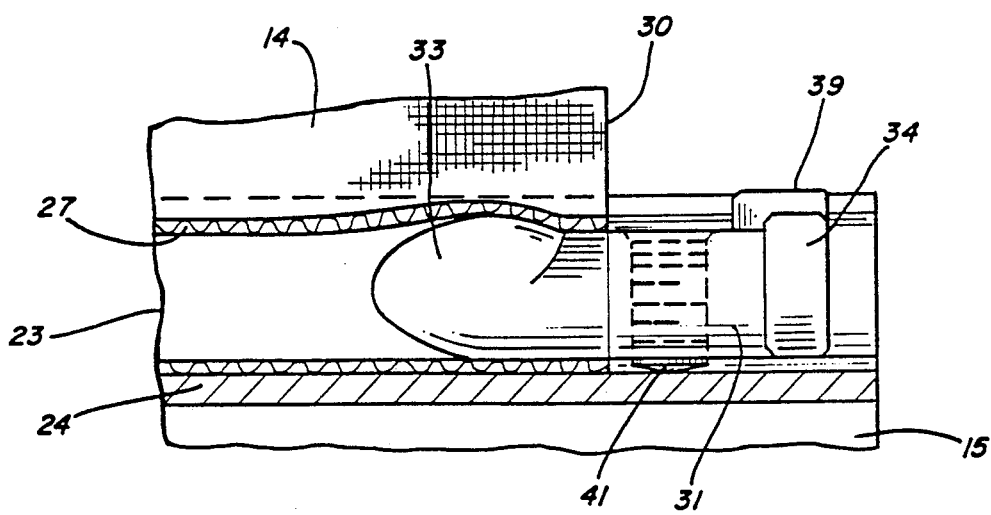
FIG. 3 is an enlarged fragmentary view taken along the line 3—3 of FIG. 1.
Figure 5:
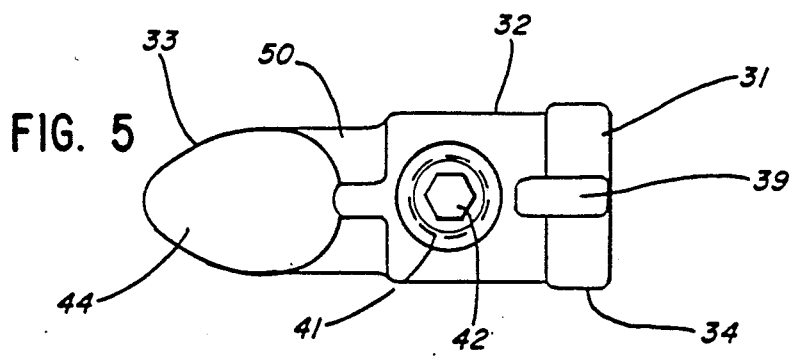
FIG. 5 is a top plan view of the locking device.
Figure 4:
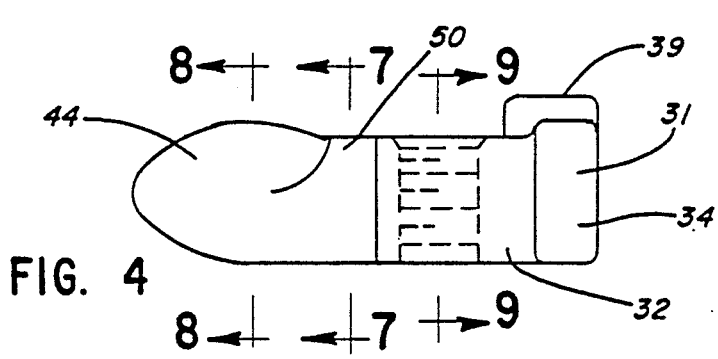
FIG. 4 is a side elevational view of the locking device.
Figure 6:
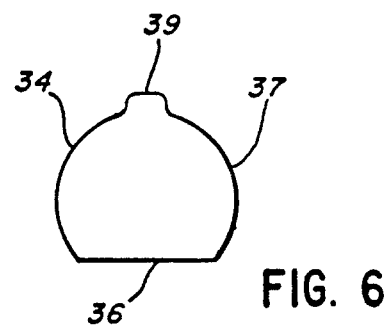
FIG. 6 view of the locking device.
Figure 7:
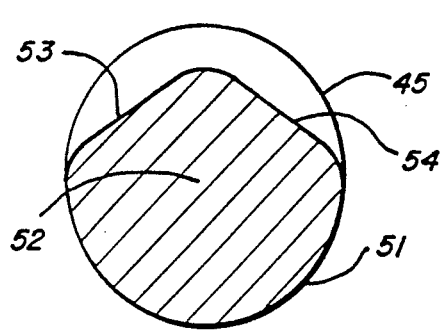
FIG. 7 is a sectional view taken along the line 7—7 of FIG. 4.
Figure 8:
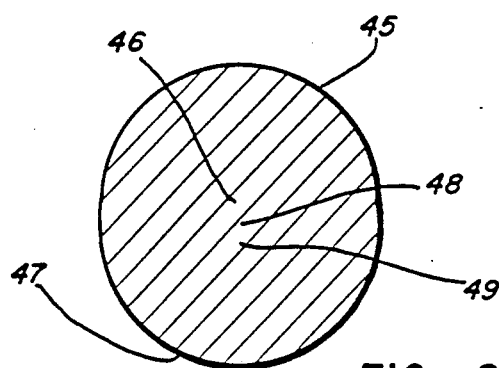
FIG. 8 is an enlarged sectional view taken along the line 8—8 of FIG. 4.
Figure 9:
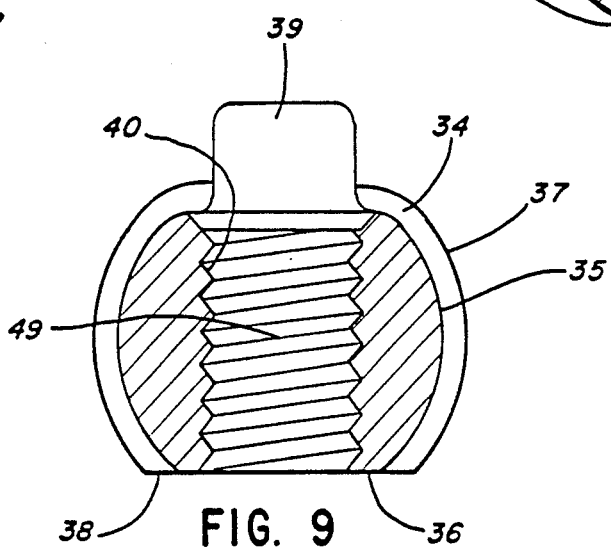
FIG. 9 is an enlarged sectional view taken along the line 9—9 of FIG. 4.

After the beaded hem of the awning is inserted into the groove, the tapered forward end 43 of a locking pin is inserted into one end of the looped hem of the awning as illustrated in FIG. 3. The set screw 41 is then screwed downwardly against the wall of the groove. As the screw is forced against the bottom of the wall, the elliptically shaped forwardly portion compresses the fabric of the awning against the wall of the groove, and the fabric is clamped between the locking pin and the wall of the groove so that the fabric is anchored against longitudinal movement within the groove. One side edge of the awning is thereby anchored against longitudinal movement relative to the groove.

The other side edge of the awning is then pulled taut and secured by inserting a second locking pin into the looped hem on that side. The sides of the awning are thereby secured to prevent wrinkling of the awning.

As is well known, a roll-up spring is housed within the roller 15. When a locking device is released, the spring causes the roller to rotate to wind the awning around the roller. As the roller rotates, the rafter arms 18 and 19 fold in half at their midpoints, and the lower telescoping arms 16 and 17 pivot upwardly to move the roller toward the side wall of the trailer. Heretofore, the hem of the awning could slide axially within the groove of the roller as the awning is being closed, causing misalignment of the arms and mounting brackets which would prevent proper roll-up of the awning. However, the locking pins 31 prevent sliding of the hem within the groove, and the awning is rolled up without interference.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. A locking device in combination with a roll-up awning assembly, the awning assembly including an elongated roller bar having a longitudinally extending groove and an awning having a hem having a loop which is positioned in the groove, the locking device comprising a generally cylindrical body portion sized to be slidably received in the groove for longitudinal sliding movement therein, means on the body for engaging the awning and restraining longitudinal movement of the awning relative to the locking device, the means for engaging the awning comprising a radially enlarged portion which is inserted into the loop of the awning to clamp the loop against the wall of the groove, and lock means on the body for locking the position of the locking device relative to the roll-up bar.

2. The locking device of claim 1 including a tab on the body portion extending transversely out of the groove for preventing rotation of the body portion in the groove.

3. The locking device of claim 1 in which the lock means includes a screw threadedly engaged with the body portion and having an end which is engageable with the wall of the groove.

4. The locking device of claim 1 in which the radially enlarged portion of the locking device is provided with a tapered end to facilitate insertion into the loop of the awning.

5. The locking device of claim 4 including a radially enlarged annular flange on the body portion for engaging the wall of the groove.

6. The locking device of claim 5 including a tab on the body portion extending radially beyond the annular collar and transversely out of the groove for preventing rotation of the body portion in the groove.

* * * * *